W. R. FOX.
UNIVERSAL JOINT.
APPLICATION FILED MAY 20, 1910.
1,108,567.  Patented Aug. 25, 1914.
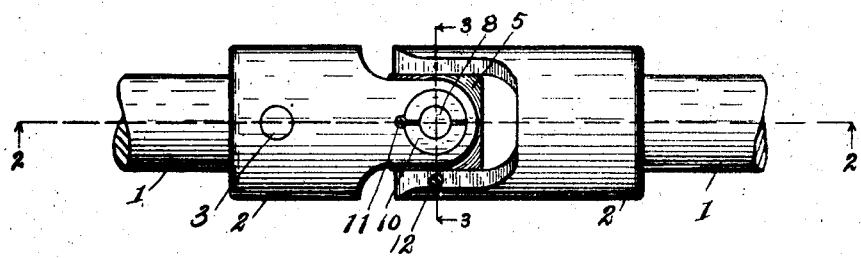
Fig.1.
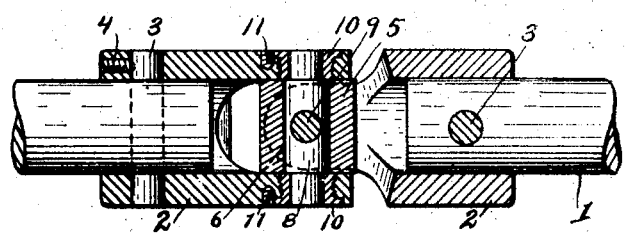
Fig.2.
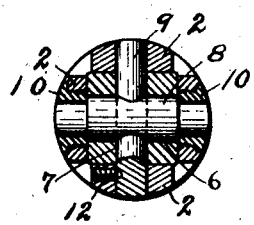 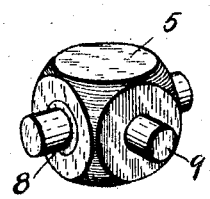
Fig.3.  Fig.4.
Witnesses  Inventor
Gertrude Tilleman  William R. Fox
Margaret Glasgow  By Chappell Earl
  Attorneys

UNITED STATES PATENT OFFICE.

WILLIAM R. FOX, OF GRAND RAPIDS, MICHIGAN.

UNIVERSAL JOINT.

1,108,567. Specification of Letters Patent. Patented Aug. 25, 1914.

Application filed May 20, 1910. Serial No. 562,449.

*To all whom it may concern:*

Be it known that I, WILLIAM R. FOX, a citizen of the United States, residing at Grand Rapids, Michigan, have invented certain new and useful Improvements in Universal Joints, of which the following is a specification.

This invention relates to improvements in universal joints.

The main objects of this invention are to provide an improved universal joint which is simple and compact in structure, and one in which the parts are simple and economical to produce and easily assembled.

Further objects, and objects relating to structural details, will definitely appear from the detailed description to follow.

I accomplish the objects of my invention by the devices and means described in the following specification.

The structure described constitutes one effective embodiment of my invention. Other embodiments would be readily devised by those skilled in the art.

The invention is clearly defined and pointed out in the claim.

A structure constituting an effective and preferred embodiment of the features of my invention is clearly illustrated in the accompanying drawing, forming a part of this specification, in which:

Figure 1 is a plan view of a structure embodying the features of my invention, the joint being shown in connection with two shaft sections; Fig. 2 is a longitudinal section taken on a line corresponding to line 2—2 of Fig. 1, certain parts being shown in full line to better illustrate their form; Fig. 3 is a transverse section taken on a line corresponding to line 3—3 of Fig. 1, the journal pins being shown mainly in full lines; Fig. 4 is a perspective view of the journal block with the journal pins arranged therein.

In the drawings, similar reference characters refer to similar parts throughout the several views, and the sectional views are taken looking in the direction of the little arrows at the ends of the section lines.

Referring to the drawing, 1, 1 represents the shaft sections to be coupled. The shaft members 2 are adapted to receive the shaft sections, the shaft sections of the structure illustrated being secured in the shaft members by means of the pins 3. These pins are retained by means of the screws 4, which are threaded into the ends of the shaft members transversely to the pins, see Fig. 2.

The journal block 5 is provided with transversely disposed holes 6 and 7, the holes being of unequal diameters. Through the larger hole 6, I arrange the shouldered journal pin 8. This journal pin 8 is provided with a central hole adapted to receive the journal pin 9 which is arranged through the other hole in the journal block, and through the pin 8, the pin 9 thus serving as a locking pin for the pin 8.

The shaft members are provided with holes for the journal pins, the holes in the shaft members being of sufficient diameter to receive their respective journal pins. The shouldered journal pin is provided with bushings 10, which are threaded into its shaft member, as clearly appears from the drawing. These bushings are shouldered at their outer ends forming enlarged heads. The heads are countersunk and seated into the joint or shaft members. The inner ends of these bushings are preferably adapted to engage both the journal block and the shoulders of the pin 8, so that the parts may be properly centered through the bushings.

The bushings 10 are locked in position by means of the screws 11, which are threaded into the shaft member to engage the peripheries of the bushings, see Fig. 2. The outer ends of these bushings and the ends of the journal pins are preferably flush with the outer surfaces of the shaft members.

The journal pin 9 is retained or locked in position by means of the screw 12, which is threaded into one of the arms of its shaft transversely to the pin, see Figs. 1 and 3. The parts are thus all effectively locked in position. At the same time, they can be readily assembled and disassembled. My improved universal joint is very simple and compact in structure, and the parts are simple and economical to produce and readily assembled.

Having thus described my invention, what I claim as new and desire to secure by Letters Patent is:

In a universal joint, the combination of the bifurcated joint members; a joint block having pin holes of unequal diameter therethrough disposed transversely to each other; a pin with shouldered journals at its ends arranged through the larger of said holes in said joint block; journal bearing bushings for said shouldered journals threaded into the arms of the corresponding joint member, the said bushings being shouldered at their outer ends forming an enlarged head on each bushing, said head being counter-sunk and seated substantially flush with the surface of said joint member, the inner ends of said bearing bushings being adapted to bear against the shoulders of said journal pin and said block; locking screws for said bushings projecting into the outer face of said joint member and engaging the enlarged head end thereof and being flush with the faces of the bushings; a smaller journal pin for the other joint member disposed and journaled through the smaller hole of said joint block and transversely through said shouldered pin; and a locking screw for retaining said smaller journal pin in its joint member.

In witness whereof, I have hereunto set my hand and seal in the presence of two witnesses.

WILLIAM R. FOX. [L. S.]

Witnesses:
LENA CHURCH,
ELVA N. LAWSON,